(12) United States Patent
Nagatani

(10) Patent No.: US 9,389,817 B2
(45) Date of Patent: Jul. 12, 2016

(54) INFORMATION PROCESSING DEVICE, CONTROL METHOD, AND STORAGE MEDIUM FOR DETERMINING WIRELESS CONNECTION METHOD TO A DEVICE

(71) Applicant: CANON KABUSHIKI KAISHA, Tokyo (JP)

(72) Inventor: Masahiro Nagatani, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/789,772

(22) Filed: Jul. 1, 2015

(65) Prior Publication Data

US 2016/0004490 A1    Jan. 7, 2016

(30) Foreign Application Priority Data

Jul. 4, 2014    (JP) .................................. 2014-138877

(51) Int. Cl.
| | |
|---|---|
| *G06F 3/12* | (2006.01) |
| *H04L 29/08* | (2006.01) |
| *H04W 76/00* | (2009.01) |
| *H04W 76/02* | (2009.01) |
| *H04L 29/06* | (2006.01) |

(52) U.S. Cl.
CPC ............ *G06F 3/1236* (2013.01); *G06F 3/1204* (2013.01); *G06F 3/1285* (2013.01); *G06F 3/1292* (2013.01); *H04L 67/36* (2013.01); *H04L 69/14* (2013.01); *H04W 76/002* (2013.01); *H04W 76/023* (2013.01)

(58) Field of Classification Search
None
See application file for complete search history.

(56) References Cited

U.S. PATENT DOCUMENTS

| | | | | |
|---|---|---|---|---|
| 9,137,851 | B2 * | 9/2015 | Niwa .................. | H04W 76/043 |
| 2005/0066072 | A1 | 3/2005 | Nakamura | |
| 2012/0257245 | A1 * | 10/2012 | McCoog ............... | G06F 3/1204 358/1.15 |
| 2013/0057903 | A1 * | 3/2013 | Yamazaki ............. | G06F 3/1204 358/1.15 |
| 2013/0258399 | A1 * | 10/2013 | Nanaumi ............. | G06K 15/405 358/1.15 |
| 2014/0044010 | A1 | 2/2014 | Hiroshige et al. | |
| 2015/0172905 | A1 * | 6/2015 | Qi ......................... | H04W 8/005 370/338 |

FOREIGN PATENT DOCUMENTS

| | | |
|---|---|---|
| AL | 2605607 A1 | 6/2013 |
| JP | 2014-36292 A | 2/2014 |

* cited by examiner

*Primary Examiner* — Paul F Payer
(74) *Attorney, Agent, or Firm* — Canon USA, Inc. IP Division

(57) ABSTRACT

An information processing device, which is wirelessly connectable to a device configured to perform a certain process, includes: a wireless connection unit configured to establish a wireless connection to the device by a first connection method in which a connection is established to the device via a wireless router, which is an external wireless router and differs from the device, or by a second connection method in which a connection is established to the device not via the wireless router; a determination unit configured to determine whether the information processing device has already been wirelessly connected to the wireless router; and a control unit configured to perform control such that, in a case where the determination unit determines that the information processing device has already been wirelessly connected to the wireless router, a connection is not established to the device by the second connection method by the wireless connection unit.

20 Claims, 8 Drawing Sheets

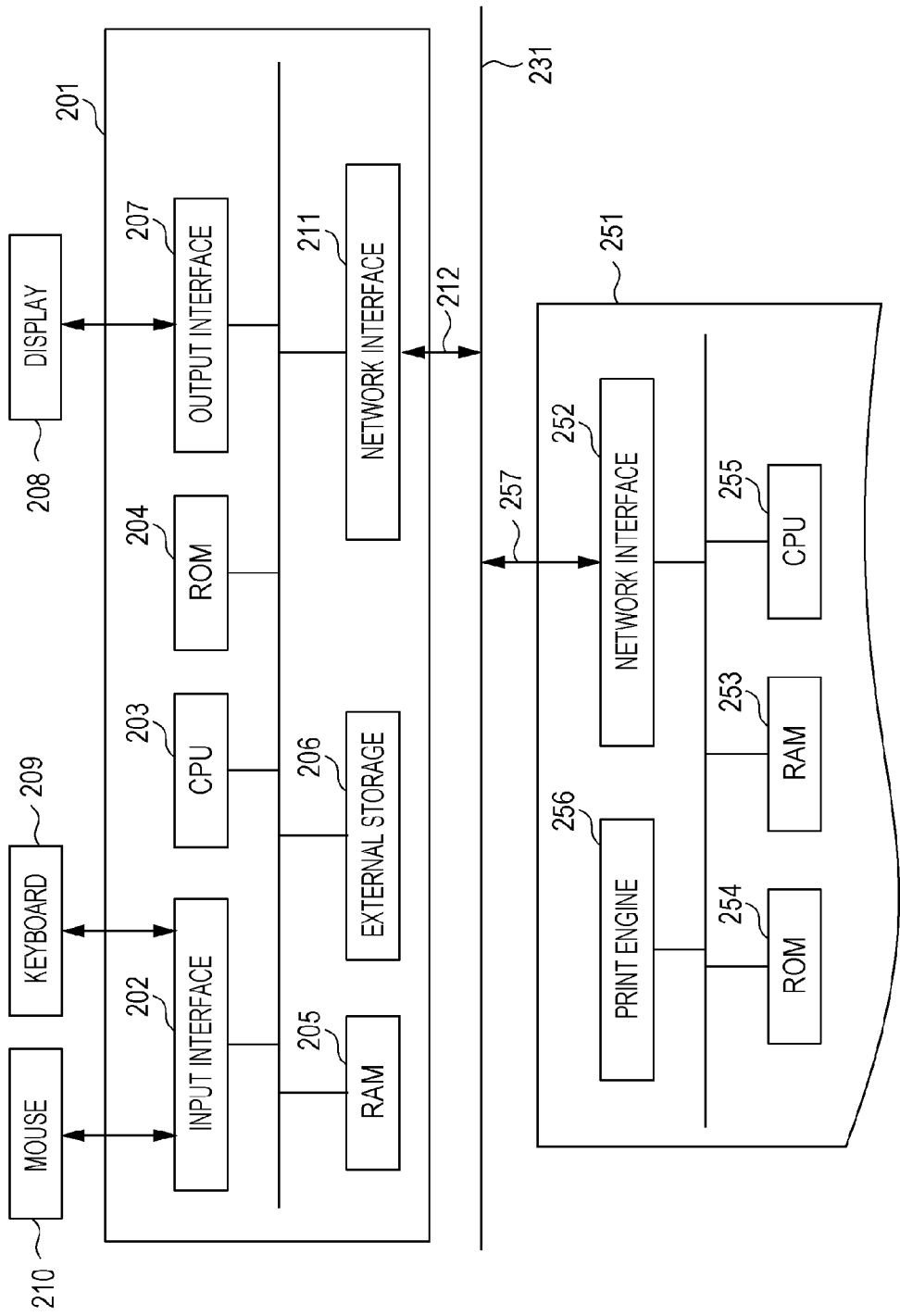

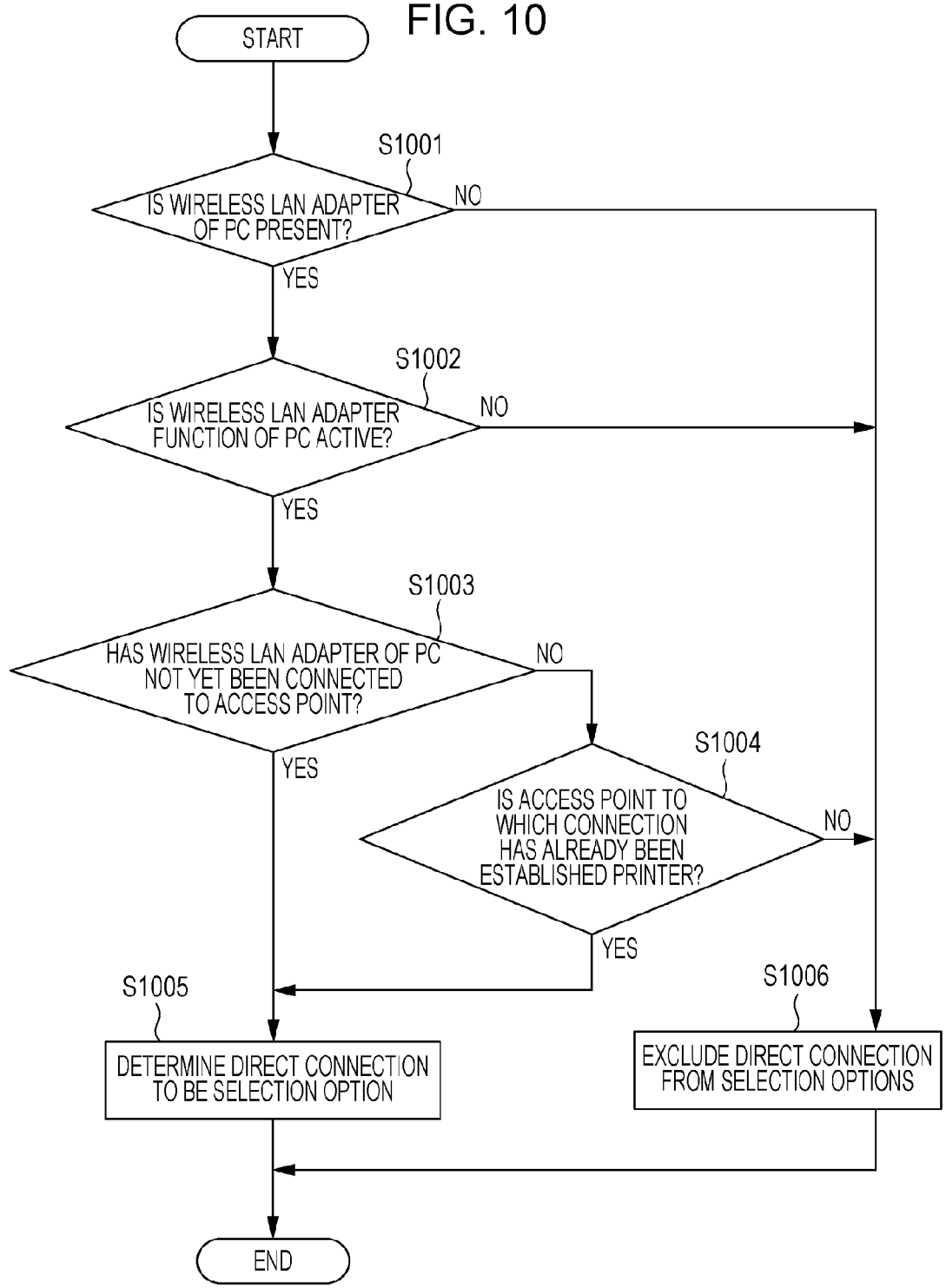

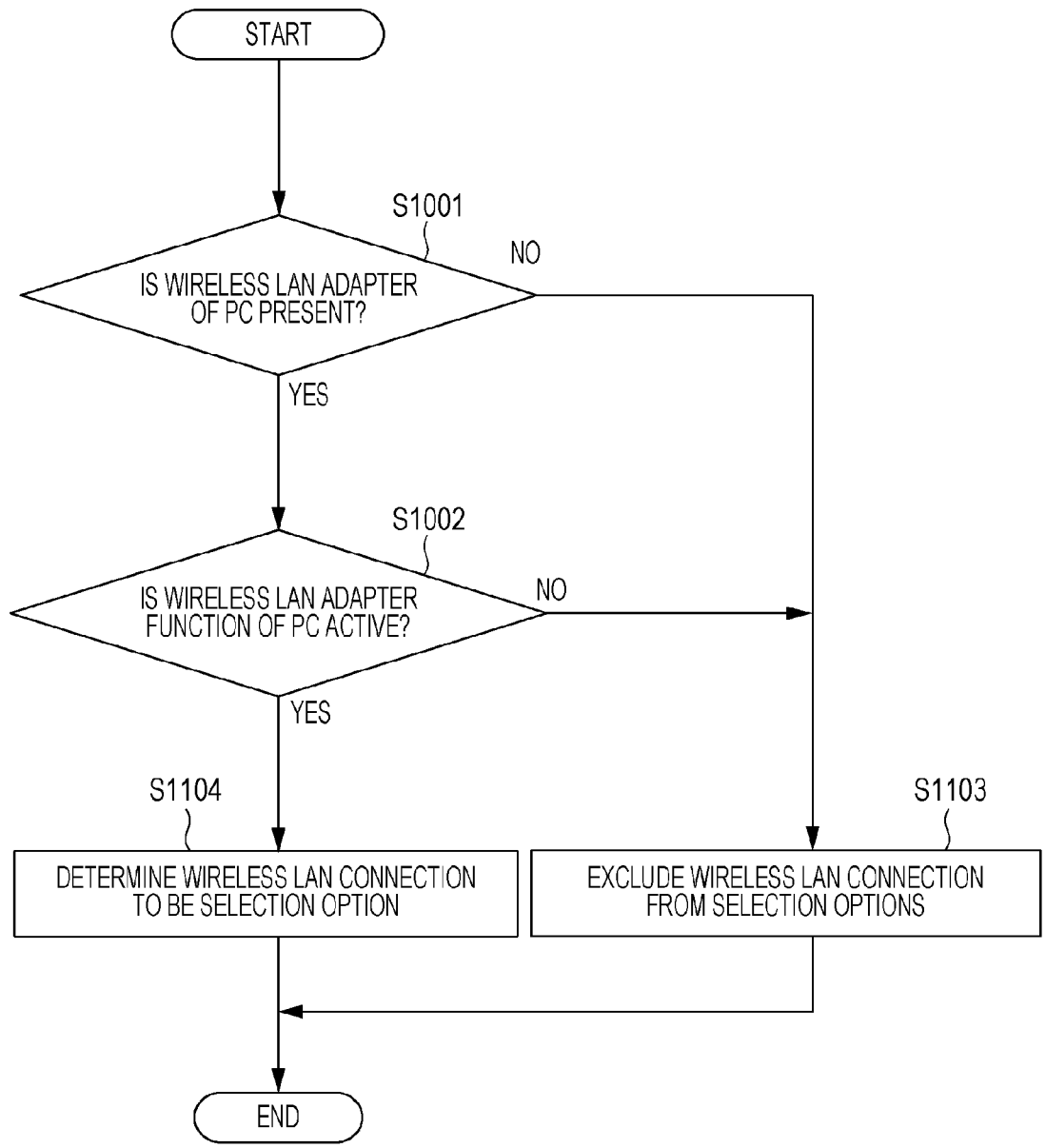

INFORMATION PROCESSING DEVICE, CONTROL METHOD, AND STORAGE MEDIUM FOR DETERMINING WIRELESS CONNECTION METHOD TO A DEVICE

BACKGROUND OF THE INVENTION

1. Field of the Invention

The present invention relates to an information processing device that is wirelessly connectable to a device that performs a certain process, a control method for the information processing device, and a storage medium.

2. Description of the Related Art

An example of a method for connecting an information terminal such as a personal computer, a smartphone, or the like to a network communication device such as a network-ready printer is a method for establishing a connection via an interconnection device called a wireless LAN router, as an access point.

In contrast, there is a method for connecting an information terminal to a network communication device such as a printer, not via a wireless LAN router. For example, in the case where a network communication device has a function through which the network communication device itself becomes an access point, an information terminal may directly communicate with the network communication device, and not via a wireless LAN router. As a result, for example, a visitor may temporarily and directly connect their smartphone to a printer, which is normally connected to an in-house wired LAN, without connecting the smartphone to an in-house network and may cause the printer to perform printing.

As described above, examples of a method for connecting an information terminal to a printer include a method for establishing a connection via a wireless LAN router, and a method for directly establishing a connection to the printer. Japanese Patent Laid-Open No. 2014-36292 describes a printer connectable to the information terminal both by a method for establishing a connection to an information terminal via a router and by a method for directly establishing a connection.

In the case where a printer is connectable by the above-described two methods as described in Japanese Patent Laid-Open No. 2014-36292, for example, there may be the case where a user sets one of the methods for connection. In this case, the user may be unable to set an appropriate connection method.

For example, in the case where the information terminal has already been connected to a wireless LAN router, there may be the case where a method for establishing a direct connection to a printer is set. However, in this case, there may be the case where the information terminal becomes unable to establish a connection to an external network such as the Internet since the information terminal is not connected to a wireless LAN router after being directly connected to the printer.

SUMMARY OF THE INVENTION

The present invention provides an information processing device that, in the case where the information processing device is wirelessly connected to a device, may be connected to the device by an appropriate connection method.

An information processing device according to the present invention is wirelessly connectable to a device configured to perform a certain process, and includes a wireless connection unit configured to establish a wireless connection to the device by a first connection method in which a connection is established to the device via a wireless router, which is an external wireless router and differs from the device, or by a second connection method in which a connection is established to the device not via the wireless router, a determination unit configured to determine whether the information processing device has already been wirelessly connected to the wireless router, and a control unit configured to perform control such that, in a case where the determination unit determines that the information processing device has already been wirelessly connected to the wireless router, a connection is not established to the device by the second connection method by the wireless connection unit.

Further features of the present invention will become apparent from the following description of exemplary embodiments with reference to the attached drawings.

BRIEF DESCRIPTION OF THE DRAWINGS

FIG. 2 is a diagram illustrating a hardware configuration according to an embodiment.

FIG. 10 is a flowchart illustrating an example of a process in which a wireless LAN connection method is determined.

FIG. 11 is a flowchart illustrating a process in which it is determined whether wireless LAN connection is included in selection options.

DESCRIPTION OF THE EMBODIMENTS

In the following, an embodiment of the present invention will be described in detail with reference to the attached drawings. Note that the following embodiment does not limit the present invention according to the claims. In addition, all combinations of characteristics described in the embodiment are not necessary to realize the present invention. Each of the embodiments of the present invention described below can be implemented solely or as a combination of a plurality of the embodiments or features thereof where necessary or where the combination of elements or features from individual embodiments in a single embodiment is beneficial.

Figure 1A:
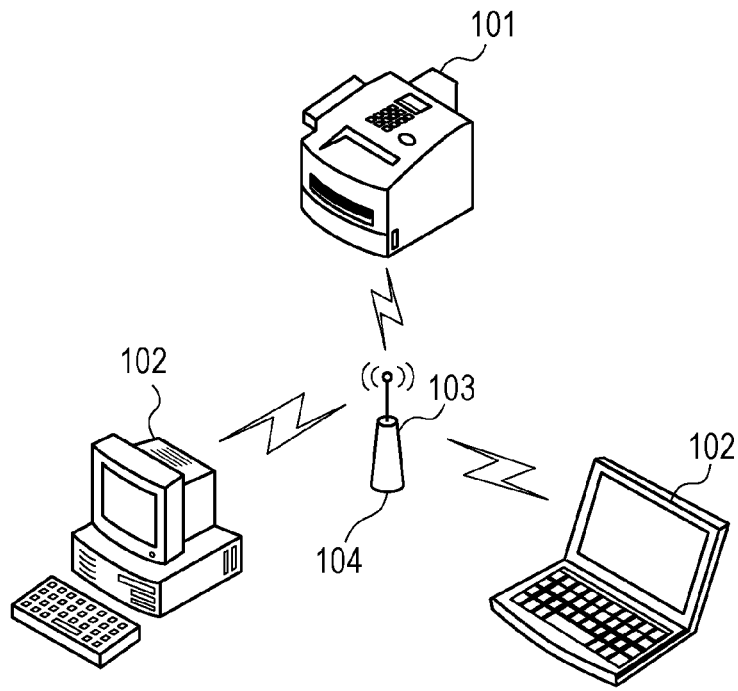
FIGS. 1A and 1B are diagrams for describing methods for connecting a PC to a printing device.
Figure 1B:
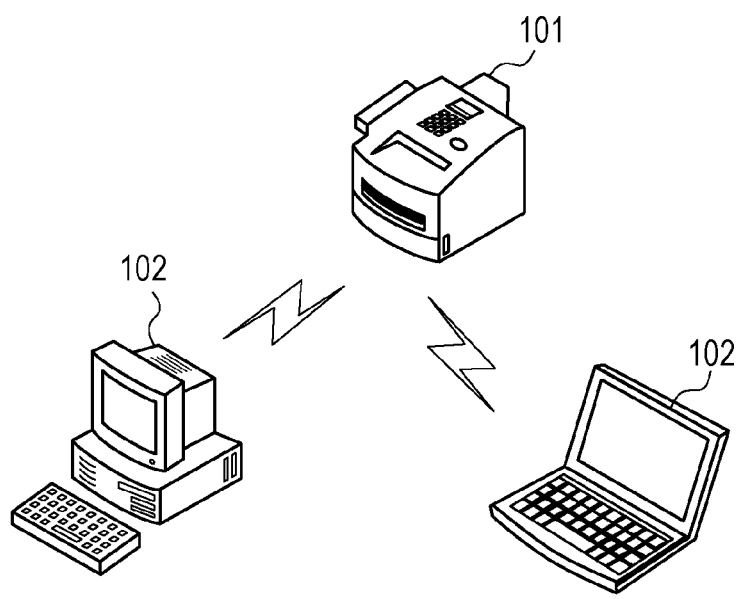

FIGS. 1A and 1B are diagrams for describing methods for connecting a PC serving as an information processing device to a printing device. First, as wireless connection methods, two wireless connection methods, infrastructure connection and direct connection, will be described. In an infrastructure connection, a printing device 101 is connected to and communicates with PCs 102 via a wireless LAN router 103, which is an external interconnection device, as illustrated in FIG. 1A. In addition, in a state in which the infrastructure connection is performed, the PCs 102 may be connected to the Internet 104 via the wireless LAN router 103. Likewise, the printing device 101 may also be connected to the Internet 104 via the wireless LAN router 103.

In contrast, in a direct connection, the printing device 101 is not connected via a wireless LAN router but is directly connected to and communicates with the PCs 102, as illustrated in FIG. 1B. Specifically, the printing device 101 itself has an access point function and is operable as an access point like a virtual wireless LAN router, realizing a function similar to that of the wireless LAN router 103, which is an external device. The PCs 102 are directly connected to and communicate with the printing device 101 using the access point function of the printing device 101. Note that in the case where the printing device 101 does not have a function for a WAN unlike an external wireless LAN router, the printing device 101 may not connect the PCs 102 to the Internet.

Next, a hardware configuration will be described which includes a printing device 251, which corresponds to the printing device 101 of FIGS. 1A and 1B, and an information processing device 201, which corresponds to one of the PCs 102 of FIGS. 1A and 1B, the information processing device 201 being connected to the printing device 251 via a network 231. FIG. 2 is a diagram illustrating a hardware configuration according to the present embodiment.

The information processing device 201 includes an input interface 202, a CPU 203, a ROM 204, a RAM 205, an external storage 206, an output interface 207, a display 208, a keyboard 209, a mouse 210, and a network interface 211.

The network interface 211 is connected to the network 231 via a network cable 212, wirelessly, or both. In other words the connection may be any of wired, wireless, or both. The network 231 is a LAN, and the network interface 211 operates as a wired LAN unit and/or a wireless LAN unit. Note that the network interface 211 is simultaneously connectable to a wired LAN and to a wireless LAN. In the case where the information processing device 201 is connected to the wireless LAN router 103, the information processing device 201 may be connected to the Internet 104 via the wireless LAN router 103.

The ROM 204 includes an initialization program. Application programs, an operating system (OS), a printer driver, and various other data are stored in the external storage 206.

The RAM 205 is used as a working memory used when various programs stored in the external storage 206 are executed.

The CPU 203 is a controller for controlling the information processing device 201. The CPU 203 performs various types of control on the information processing device 201 by executing, on the RAM 205, application programs, various programs, and the OS stored in the external storage 206 or the ROM 204. An operation of the information processing device 201 described in the following is realized under control of the CPU 203.

The input interface 202 receives a user's instructions to the mouse 210 and the keyboard 209 and sends the instructions to the CPU 203. The CPU 203 performs control in accordance with such an instruction.

The output interface 207 outputs various data (images, icons, various menus, and the like) expanded in the RAM 205 to the display 208, which is a display device such as an LCD, under the control of the CPU 203. As a result, the various data are displayed on the display 208.

The above-described hardware configuration is designed assuming the case where the information processing device 201 is a PC; however, the information processing device 201 may also be a smartphone, a tablet PC, a mobile phone, or a PDA. For example, in the case of a smartphone, a touch panel may also be installed instead of the mouse 210 and the keyboard 209. In this case, the information processing device 201 itself has a touch panel. Likewise, the information processing device 201 itself has the display 208.

The printing device 251 includes a network interface 252, a RAM 253, a print engine 256, a ROM 254, and a CPU 255.

The network interface 252 is connected to the network 231 via a network cable 257 or wirelessly. Note that in the case where the printing device 251 is connected to the wireless LAN router 103, the printing device 251 may be connected to the Internet 104 via the wireless LAN router 103. Through the connection to the Internet, for example, the printing device 251 may refer to manuals available on the Web, access an ink store in the case where a recording material such as ink has run out, or download the latest firmware available on the Internet. Alternatively, printing may be performed via the Internet using a cloud printer, E-mail printing, or the like.

The RAM 253 is used as a main memory and a working memory of the CPU 255. For example, the RAM 253 serves as a reception buffer for temporarily storing a print job received via the network 231 or as a memory for storing various data. Various control programs for controlling the printing device 251 and data used by each control program are stored in the ROM 254.

The CPU 255 controls portions of the printing device 251 by executing, on the RAM 253, these control programs stored in the ROM 254.

The print engine 256 prints images on print mediums in accordance with the data received by the network interface 252 and stored in the RAM 253. As a printing system, an ink-jet system may be used. For example, an electrophotographic system may be used.

Here, as an example, the information processing device 201 and the printing device 251 share processing as described above; however, a manner in which the processing is shared is not limited to this example and may also differ from this example.

Next, a process performed by the information processing device 201 to establish a connection to the printing device 251 will be described using FIG. 3. Note that a setup program for connecting the information processing device 201 to a printing device is stored in the external storage 206. The process of FIG. 3 is realized by the CPU 203 executing the setup program on the RAM 205.

Figure 3:
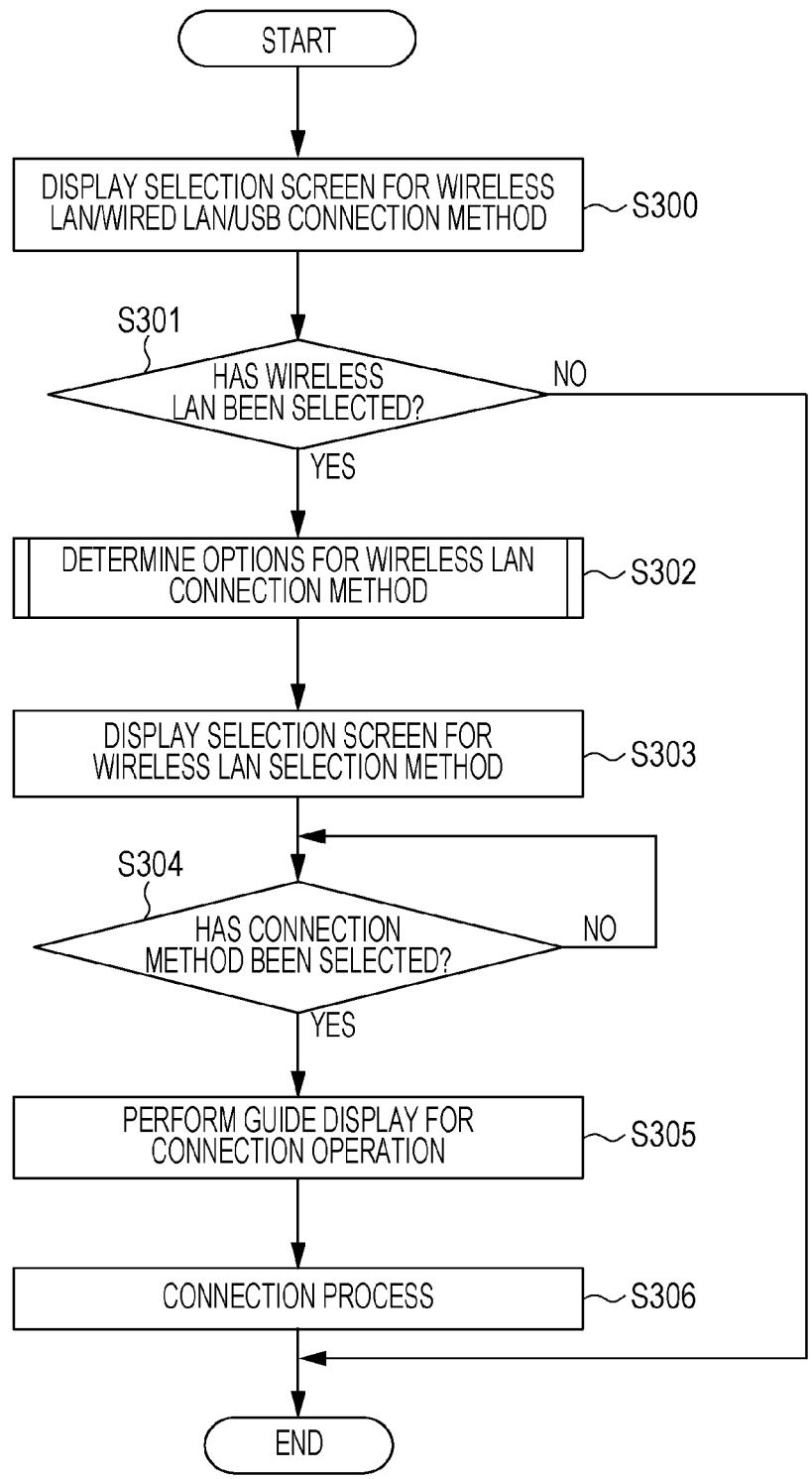
FIG. 3 is a flowchart illustrating a connection process performed by an information processing device.

The process of FIG. 3 is started when the setup program is activated. First, the CPU 203 performs display control in which the display 208 is caused to display a selection dialog box as a screen where a connection method for connecting the information processing device 201 to the printing device 251 is selectable (S300).

Figure 4:
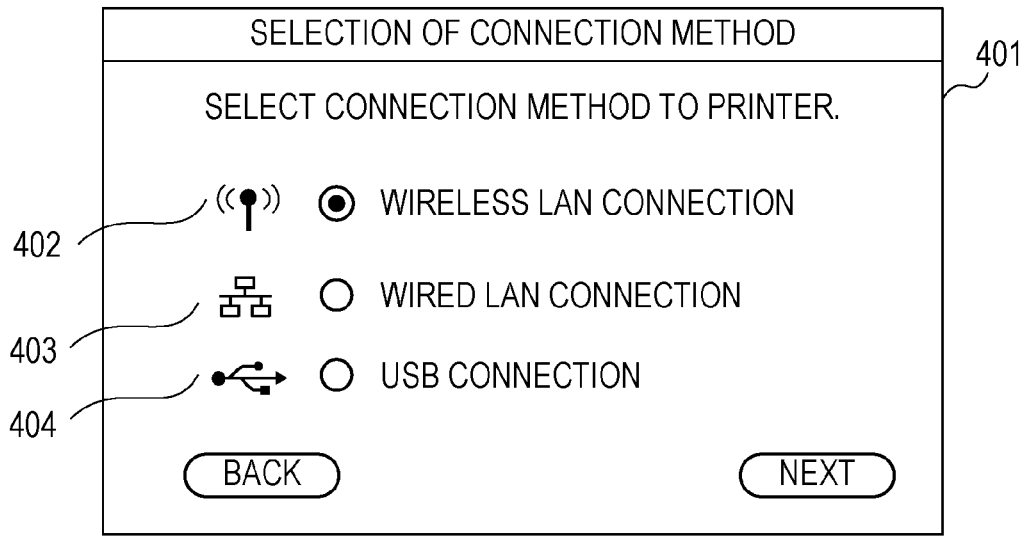
FIG. 4 is a diagram illustrating an example of a selection dialog box for a connection method.

FIG. 4 is a diagram illustrating an example of a selection dialog box for a connection method. A list of a selection dialog box 401 includes the options: wireless LAN connection 402, wired LAN connection 403, and USB connection 404. Although the wireless LAN connection 402 is selected at an initial stage, another connection method may be selected by a user specifying another option.

Next, the CPU 203 confirms whether the wireless LAN connection 402 has been selected (S301). In the case where the wireless LAN connection 402 has been selected, the process proceeds to S302. In the case where another connection method has been selected, the process ends. Note that in the case where the wired LAN connection 403 or the USB connection 404 has been selected, various setting processes are also performed; however, the description for such a case will be omitted in the present embodiment.

In the case where the wireless LAN connection 402 is selected, the CPU 203 determines options, which are connection methods, for the wireless LAN connection (S302). The information processing device 201 may perform, as wireless LAN connection methods, "connection via a wireless LAN router (the above-described infrastructure connection)" and "direct connection". In S302, it is determined whether both of the two connection methods are determined to be selection options for the wireless LAN connection method, or only the infrastructure connection is determined to be a selection option for the wireless LAN connection method. The details will be described later using the flowchart of FIG. 10.

Figure 7:
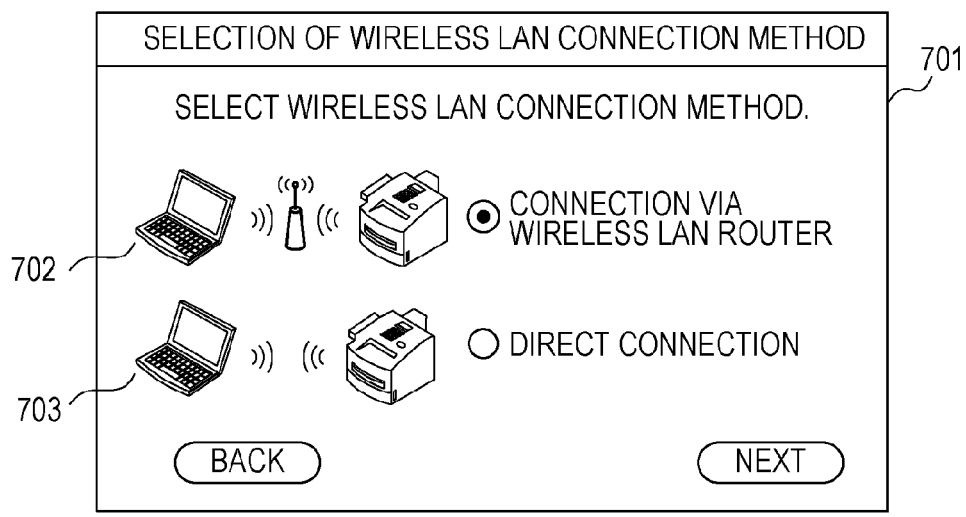
FIG. 7 is a diagram illustrating an example of a selection dialog box for a wireless LAN connection method.

When the selection option or options for the wireless LAN connection method are determined in S302, the CPU 203 performs display control in which a selection dialog box is caused to be displayed as a screen where a wireless LAN connection method is selectable (S303). Note that the selection option or options determined in S302 are selectable in the selection dialog box for the wireless LAN connection method. FIG. 7 is a diagram illustrating an example of a selection dialog box for a wireless LAN connection method. In a list of the selection dialog box of FIG. 7, both of "connection via a wireless LAN router" 702 (a PC and a printing device are connected via a wireless LAN router) and "direct connection" 703 (a PC is directly connected to a printing device without using a wireless LAN router) are selectable.

Next, the CPU 203 confirms whether a connection method has been selected for the wireless LAN connection (S304). When it is confirmed that such a selection has been made, the CPU 203 causes the display 208 of the information processing device 201 to perform guide display (not illustrated) for describing an operation method to set connection settings through a display panel of the printing device 251 or using a wireless LAN router (S305). An example of an operation method for connection is a push-button system (a system in which a connection is established by setting the mode of an information processing device or a printing device to a certain mode and by pushing a certain button of a wireless LAN router). In addition, systems may also be used, in an example of which a connection is established by manual setting (a system in which a printing device searches for a wireless LAN router and a user enters a password) and in another example of which a connection is established using a setup program on a PC.

When these operations are performed by the user, the CPU 203 performs a connection process for connecting the information processing device 201 to a printing device via a wireless LAN router or directly (S306). As a result, establishment of a wireless connection to the printing device is completed.

As described above, it is determined in S302 whether, as a wireless LAN connection method, both of infrastructure connection and direct connection are to be options for the user or only the infrastructure connection is to be an option.

FIG. 10 is a flowchart representing S302, and illustrates an example of a process in which a wireless LAN connection method is determined.

First, the CPU 203 determines whether the information processing device 201 (PC) includes a wireless LAN adapter (S1001). In the case where it is determined that the information processing device 201 does not include a wireless LAN adapter, the CPU 203 performs a process in which the direct connection is excluded from the selection options in a selection dialog box for the wireless LAN connection method (S1006).

Figure 8:
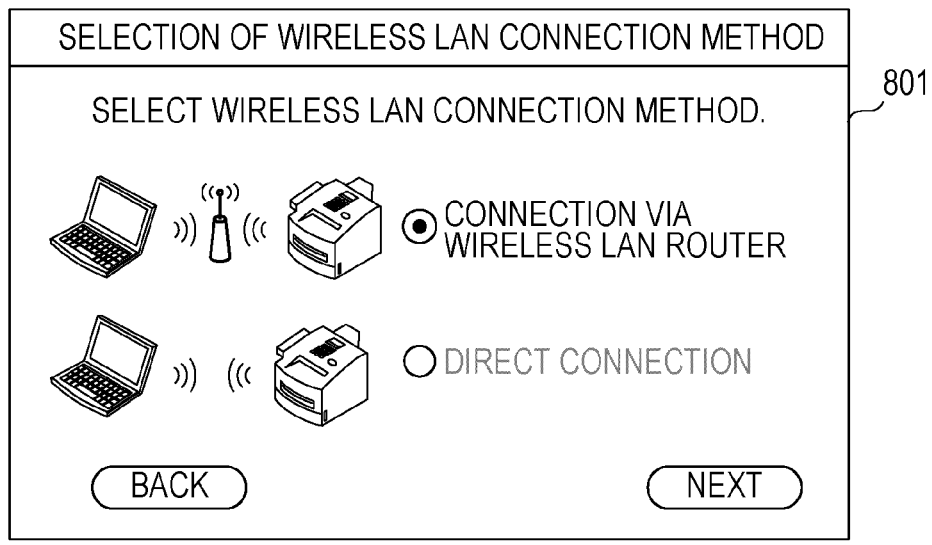
FIG. 8 is a diagram illustrating an example of a selection dialog box for a connection method, the selection dialog box being displayed such that direct connection may not be selected.
Figure 9:
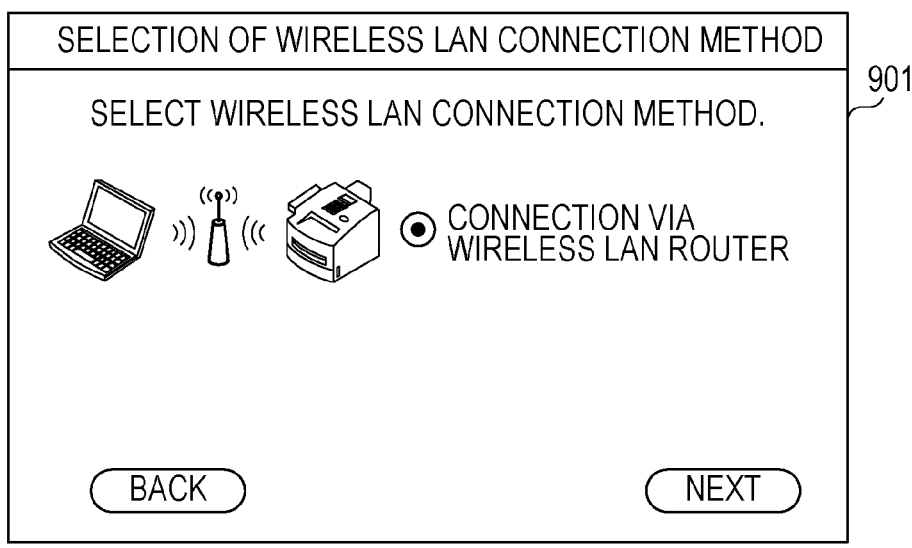
FIG. 9 is a diagram illustrating another example of a selection dialog box for a wireless LAN connection method, the selection dialog box being displayed such that direct connection may not be selected.

As a result of processing in S1006, the selection dialog box for the wireless LAN connection method is displayed in S303 of FIG. 3 such that direct connection may not be selected. FIG. 8 is a diagram illustrating an example of a selection dialog box for a wireless LAN connection method, the selection dialog box being displayed such that direct connection may not be selected. In the selection dialog box of FIG. 8, "direct connection" is grayed out and "direct connection" may not be selected even when the user specifies it. "Connection via a wireless LAN router" is the selection option. FIG. 9 is a diagram illustrating another example of a selection dialog box for a wireless LAN connection method, the selection dialog box being displayed such that direct connection may not be selected. Since "direct connection" is not displayed in FIG. 9, it is impossible to select it.

Figure 5:
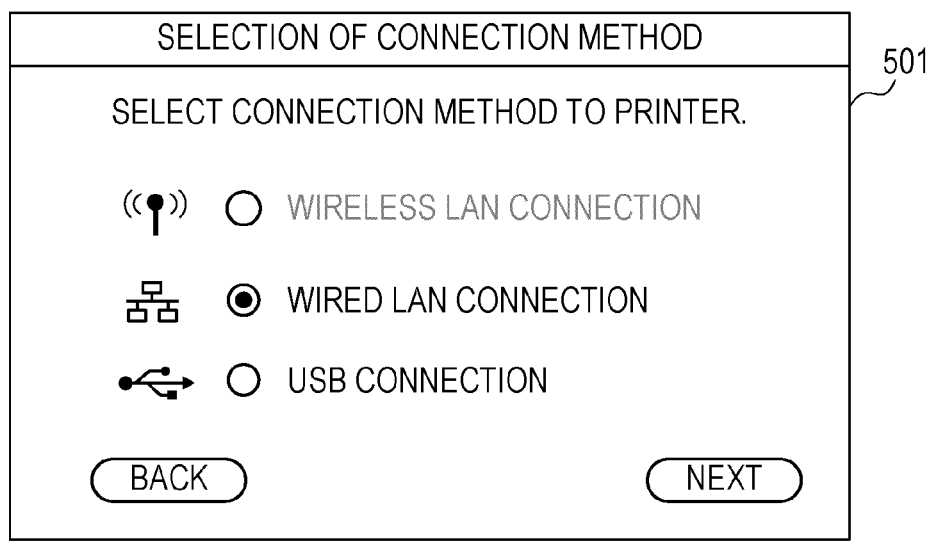
FIG. 5 is a diagram illustrating an example of a selection dialog box for a connection method, the selection dialog box being displayed such that wireless LAN connection may not be selected.

In S1006, the CPU 203 may also display the selection dialog box for the connection method illustrated in FIG. 4 again. Here, the selection dialog box may also be displayed such that wireless LAN connection may not be selected. FIG. 5 is a diagram illustrating an example of a selection dialog box for a connection method, the selection dialog box being displayed such that wireless LAN connection may not be selected. In FIG. 5, "wireless LAN connection" is grayed out and may not be selected, and wired LAN connection and USB connection become selection options. Similarly to as in FIG. 9, control may also be performed such that "wireless LAN connection" is not displayed.

In the case where it is determined in S1001 that the information processing device 201 (PC) includes a wireless LAN adapter, the CPU 203 confirms whether its wireless LAN adapter function is active (S1002).

In the case where it is confirmed that the wireless LAN adapter function is not active (in the case where it is inactive), a process is performed in which the direct connection is excluded from the selection options in the selection dialog box for the wireless LAN connection method (S1006).

Note that, here, also in the case where the PC does not include a wireless LAN adapter (No in S1001), connection via a wireless LAN router (infrastructure connection) is selectable. However in such a case, not limited to this, an error screen indicating that there is no wireless LAN adapter may also be displayed without displaying the selection dialog box (FIGS. 8 and 9) for the wireless LAN connection method.

In the case where it is confirmed in S1002 that the wireless LAN adapter function is active, the CPU 203 further determines whether the wireless LAN adapter of the PC has not yet been connected to a wireless LAN router (S1003).

In the case where it is determined in S1003 that the wireless LAN adapter has not yet been connected, the CPU 203 determines that direct connection is to be a selection option in the selection dialog box for the wireless LAN connection method (S1005). Note that when processing in S1005 is performed, as illustrated in FIG. 7, the selection dialog box is displayed in S303 of FIG. 3 such that "direct connection" is selectable.

In contrast, in the case where it is determined in S1003 that the wireless LAN adapter has already been connected, the CPU 203 confirms whether an access point to which the connection has already been established is a certain type of device (here, a printer) serving as an access point (S1004). In the present embodiment, in the case where the information processing device 201 is directly connected to a printer, a direct connection is established by the printer serving as an access point. Thus, in the case where the information processing device 201 has already been connected to an access point and where the access point is a printer, a direct connection has already been established to the printer. Thus, it is confirmed in S1004 whether the access point to which the connection has already been established is a printer, that is, whether a direct connection has already been established to the printer.

Note that processing in S1003 and S1004 is realized by the setup program making an inquiry to the OS via a certain API. Specifically, in the case where a wireless LAN connection is established, the SSID of a communication partner to which the connection has already been established is managed by the OS. After the setup program makes an inquiry to the OS, in the case where a wireless LAN connection is established, the OS returns the SSID of the communication partner to the setup program. In the case where a wireless LAN connection is not established, the OS returns a response indicating that a connection is not established. A determination in S1004 is made in accordance with whether a Vendor ID of a basic service set identifier (BSSID) included in the SSID of the communication partner to which the connection has already been established matches a certain printer maker name. That is, if the Vendor ID corresponds to a certain printer maker, it may be confirmed that the destination to which the connection has been established is a printer. Note that, the present embodiment is not limited to using Vendor IDs, for example, a model ID indicating a device type such as a wireless LAN router, a camera, a printer, a PC, or the like may also be used. Alternatively, for example, an ID obtained by combining a maker name and a model ID of a printer may also be used.

The information processing device 201 has already acquired the Vendor ID and the model ID from the destination to which the connection has been established, when performing wireless LAN connection. Information indicating that the destination to which the connection has been established is a printer (the Vendor ID and the model ID) is included in the setup program. Thus, in the case where the information acquired from the destination to which the connection has been established matches the information included in the setup program, the CPU 203 may determine whether the access point to which the connection has already been established is a printer, that is, whether a direct connection has already been established to the printer.

In the case where it is determined in S1004 that the access point to which the connection has already been established is a printer, that is, a direct connection has already been established to the printer, the CPU 203 determines that direct connection is to be a selection option (S1005). This is because, for example, in the case where it is desired that a direct connection be established again to refresh the connection although a direct connection has been established to the printer, the user is unable to perform an operation for reconnection if direct connection may not be selected. In addition, for example, also in the case where although a direct connection has been established to a certain printer, it is desired that the connection destination of the direct connection be changed to another printer, the user needs to select direct connection in the selection dialog box. For these reasons, in the case where the access point to which the connection has already been established is a printer, direct connection is determined to be a selection option.

In contrast, in the case where it is determined in S1004 that the access point to which the connection has already been established is not a printer, the CPU 203 excludes the direct connection from the selection options (S1006).

This is because, in the case where the access point to which the connection has already been established is not a printer, it is considered that the information processing device 201 is connected to an external wireless LAN router operating as an access point. In this case, if a direct connection is established to the printing device 251, a connection to the Internet may not be established, which is possible by infrastructure connection via an external wireless LAN router. Thus, in such cases, as in FIGS. 8 and 9, the direct connection is excluded from the selection options in the selection dialog box.

Note that in the case where the direct connection is excluded from the selection options in S1006, the selection dialog box is displayed in S303 such that direct connection may not be selected as illustrated in FIGS. 8 and 9. However, in the present embodiment, in the case where a wireless LAN connection is established not by direct connection, the wireless LAN connection is established by infrastructure connection. Thus, the connection method may be determined to be infrastructure connection and the connection process may be automatically performed without displaying the above-described selection dialog box.

In addition, also in the case where the information processing device 201 is unable to establish a direct connection to the printing device 251 using the setup program due to various reasons caused by factors and the like related to the OS, control may be performed such that direct connection may not be selected.

Note that, in the above-described example, after the user has selected wireless LAN connection in S300 and S301 of FIG. 3 from among connection methods such as wireless LAN connection, wired LAN connection, USB connection, and the like, it is determined in S1001 and S1002 of FIG. 10 whether the wireless LAN adapter of the information processing device 201 is present. In the case where it is determined that there is no wireless LAN adapter or the wireless LAN adapter is deactivated, the direct connection is excluded from the selection options in S1006.

Note that, as described above, in the case where there is no wireless LAN adapter or the wireless LAN adapter is deactivated, there may be the case where a wireless LAN connection may not be established regardless of whether infrastructure connection or direct connection is performed. Thus, determinations may be performed in S1001 and S1002 before the selection dialog box for the wireless LAN/wired LAN/USB connection method is displayed in S300 of FIG. 3, and the determination results may also be reflected in a display process in S303.

FIG. 11 is a flowchart illustrating a process in which it is determined whether wireless LAN connection is to be included in the selection options displayed in S300. Note that, similarly to as in the case of the process of FIG. 10, the process of FIG. 11 is also performed by the CPU 203.

The process illustrated in FIG. 11 is performed after the setup program is activated and the process illustrated in FIG. 3 is started, and before the selection dialog box for the connection method is displayed in S300.

The determination processes in S1001 and S1002 are almost the same as the processes described using FIG. 10, and thus the description thereof will be omitted.

Then, in the case where it is determined in S1001 that the wireless LAN adapter is present and the wireless LAN adapter function is active, in S1104, the wireless LAN connection is determined to be a selection option in the selection dialog box displayed in S300. As a result, the selection dialog box is displayed in S300 such that the wireless LAN connection is selectable as illustrated in FIG. 4.

Figure 6:
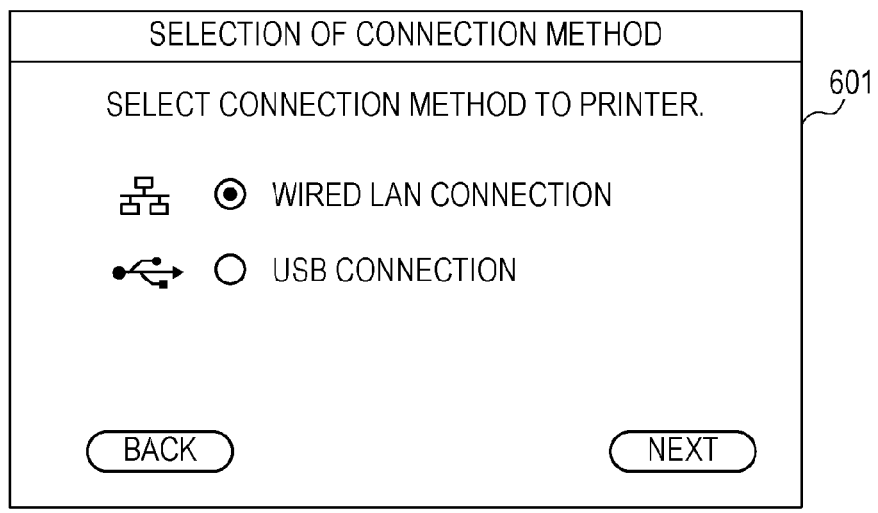
FIG. 6 is a diagram illustrating another example of a selection dialog box for a connection method, the selection dialog box being displayed such that wireless LAN connection may not be selected.

In the case where it is determined in S1001 that the wireless LAN adapter is absent or in S1002 that the wireless LAN adapter function is inactive, the process proceeds to S1103. In S1103, the wireless LAN connection is excluded from the selection options in the selection dialog box displayed in S300. As a result, in S300, the selection dialog box for the connection method is displayed such that the wireless LAN connection is grayed out and may not be selected as illustrated in FIG. 5. FIG. 6 is a diagram illustrating another example of a selection dialog box for a connection method, the selection dialog box being displayed such that wireless LAN connection may not be selected. In FIG. 6, "wireless LAN connection" is not displayed and is not selected by the user.

In this manner, the selection dialog box is displayed such that the wireless LAN connection may not be selected. As a result, even in the case where the wireless LAN adapter is absent or the case where its function is inactive, wireless LAN connection may be prevented from being selected by the user as the connection method. Furthermore, since it is determined whether wireless LAN connection is available before the selection dialog box is displayed, the case may be prevented where wireless LAN connection may not be performed even though the user has specified the wireless LAN connection.

As a result of performing processing in S1104, in the case where the wireless LAN connection is determined to be a selection option, the selection dialog box illustrated in FIG. 4 is displayed, and the user has selected the wireless LAN connection, the processing in S303 of FIG. 3 is performed. Note that, in this case, since the processing in S1001 and S1002 of FIG. 10 has already been performed in FIG. 11, the process starts from S1003 here.

As described above in the present embodiment, when the information processing device 201 establishes a wireless connection to the printing device 251, it is determined whether the information processing device 201 has already been wirelessly connected to an external wireless router, which differs from the printing device 251. In the case where it is determined that the information processing device 201 has already been connected to such a wireless router, direct connection is excluded from selection options related to the connection method such that a direct connection is not established to the printing device 251.

In the case where the information processing device 201 has already been connected to a wireless router, the information processing device 201 is connectable to the printing device 251 via the wireless router and may also be connected to an external network such as the Internet via the wireless router. However, when the state of the information processing device 201 changes from the state in which the information processing device 201 has already been connected to the wireless router to the state in which a direct connection is established to the printing device 251, there may be the case where a connection is unable to be established to an external network via the printing device 251 and a connection is unable to be established to the Internet.

Thus, in the present embodiment, in the case where the information processing device 201 has already been connected to a wireless router, control is performed such that not a direct connection but a connection via the wireless router is established to the printing device 251. As a result, the case may be prevented where the connection between the information processing device 201 and the Internet is shut off without the user's intention by establishing a direct connection to the printing device 251.

In addition, for example, there may be the case where when there is a wireless LAN router at home, the user's smartphone is automatically connected to the wireless LAN router to use a high speed communication and the case where the user's smartphone is connected to the Internet at other places outside home with 3G, LTE, or the like. However, when a direct connection is established to a printing device without the user's intention even in the environment where there is a wireless LAN router at home, a connection is established to the Internet through a communication line the communication speed of which is relatively slow such as 3G, LTE, or the like. Furthermore, if a connection to the Internet with 3G or LTE is charged on a pay-as-you-go basis, this becomes especially a significant issue.

Furthermore, when a printing device is in an access point mode, the number of terminals that may be connected to the printing device is limited to a few and many terminals may not be connected to the printing device unlike wireless LAN routers to which tens of terminals are connectable. Thus, if many information processing devices select direct connection without intention, the number of the information processing devices may exceed the above-described upper limit. In particular, this becomes a significant issue in the environment where there are many terminals such as client PCs, smartphones, and the like.

According to the present embodiment, in the case where a smartphone has already been connected to a wireless LAN router, control is performed such that not a direct connection but a connection via the wireless router is established to the printing device 251. The case may thus be prevented where a mobile terminal such as a smartphone or the like is connected to the Internet with 3G or LTE without the user's intention. In addition, the case may be prevented where the number of terminals selecting direct connection to the printing device 251 exceeds the maximum number of terminals connectable to the printing device 251 by direct connection.

In contrast, in the case where the information processing device 201 has not yet been connected to a wireless router, the information processing device 201 is allowed to establish a direct connection to the printing device 251. Many technical terms are used for the settings of wireless LAN routers and for establishment of a connection between such a wireless LAN router and another device. For example, in the case where not a user but a provider installs such a wireless LAN router, the user may not even know the presence of the wireless LAN router. In such a case, the user may send an instruction to establish a direct connection to a printing device.

Note that the above-described example describes the effect of the information processing device according to the present embodiment; however, the present embodiment has an effect also on printing devices.

The printing device 251 is connected to the Internet via a wireless router and, for example, may receive print jobs, refer to manuals on the Web, access a Web page to purchase ink, and the like. In addition, the printing device 251 may be connected to the Internet via a wireless router, even when being connected to the information processing device 201 via the wireless router. However, when the printing device 251 is directly connected to the information processing device 201, the printing device 251 may not be connected to the Internet since the connection to the wireless router is shut off.

According to the present embodiment, in the case where an information processing device has already been connected to a wireless LAN router, restrictions are placed on establishment of a direct connection. Thus, the case may be prevented where the connection between the printing device 251 and the Internet is shut off without the user's intention by establishing a direct connection.

In addition, in the present embodiment, the information processing device 201 may be connected to a router using a wired LAN and to the Internet via the router. Furthermore, even if the information processing device 201 is directly connected to the printing device 251 using a wireless LAN, the information processing device 201 may be connected to a router using a wired LAN. Thus, for example, a direct wireless connection may be established to a printing device also in the environment where a connection to the Internet is established only using an in-house LAN or a wired LAN installed in an apartment.

In the present embodiment, for a determination as to whether a direct connection is allowed, a connection to a wireless LAN router is taken into consideration; however, a connection to a wired LAN is not taken into consideration. Thus, even if the information processing device 201 is connected to a router in a wired manner, a direct wireless LAN connection may be selected by the user.

Note that in the above-described embodiment, as a method for directly connecting the information processing device 201 to the printing device 251, the example has been described in which the printing device 251 itself operates as an access point. However, such a method is not limited to this and methods for wireless connection without using access points may also be used. Examples of such methods include WLAN connection in an ad hoc mode. In this case, the processing in S1004 in FIG. 10 does not have to be performed.

Note that in the above-described embodiment, a PC has been mainly described as an example of the information processing device 201; however, the processing described in the present embodiment may also be applied to various devices such as smartphones, tablet PCs, PDAs, cameras, and the like.

In addition, a printer that prints images has been described as an example of a connection destination of a wireless LAN connection; however, such a connection destination is not limited to this. For example, scanners that read document, cameras that take pictures, and other information processing devices such as PCs, smartphones, tablet PCs, and the like may also be used.

Note that the functions of the present embodiment may also be realized with the following configuration. That is, the functions of the present embodiment may also be achieved by supplying the program code for performing the process of the present embodiment to a system or device, and by executing the program code using a computer (or a CPU or an MPU) of the system or device. In this case, the program code itself, which has been read from a storage medium, realizes the functions of the above-described embodiment, and the storage medium storing the program code also realizes the functions of the present embodiment.

In addition, the program code for realizing the functions of the present embodiment may be executed by one computer (a CPU or an MPU) and may also be executed by a plurality of computers in a cooperative manner. Furthermore, the program code may also be executed by a computer, and hardware devices such as a circuit that realizes the functions of the program code may also be provided. Alternatively, a portion of the program code may be realized by a hardware device, and the rest of the program code may be executed by a computer.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-138877 filed Jul. 4, 2014, which is hereby incorporated by reference herein in its entirety.

What is claimed is:

1. An information processing device, which is wirelessly connectable to a device configured to perform a certain process, comprising:
   a wireless connection unit configured to establish a wireless connection to the device by a first connection method in which a connection is established to the device via a wireless router, which is an external wireless router and differs from the device, or by a second connection method in which a connection is established to the device not via the wireless router;
   a determination unit configured to determine whether the information processing device has already been wirelessly connected to the wireless router; and
   a control unit configured to perform control such that, in a case where the determination unit determines that the information processing device has already been wirelessly connected to the wireless router, a connection is not established to the device by the second connection method by the wireless connection unit.

2. The information processing device according to claim 1, wherein
   the wireless connection unit establishes a connection to the device by the first or second connection method selected through a screen for selecting the connection method to be used by the wireless connection unit, and
   in the case where the determination unit determines that the information processing device has already been wirelessly connected to the wireless router, the control unit performs display control in which the screen is displayed such that the second connection method cannot be selected through the screen.

3. The information processing device according to claim 2, wherein the control unit performs display control such that on the screen displayed, the second connection method is not able to be selected even when information indicating the second connection method is included in the screen and the information is specified.

4. The information processing device according to claim 2, wherein the control unit performs display control such that on the screen displayed, the screen includes no information indicating the second connection method.

5. The information processing device according to claim 1, wherein in a case where the determination unit determines that the information processing device has not yet been wirelessly connected to the wireless router, the wireless connection unit is connectable to the device by the second connection method.

6. The information processing device according to claim 1, further comprising:
a wired connection unit connectable to a router in a wired manner,
wherein the wireless connection unit is connectable to the device by the second connection method even in a case where the wired connection unit has already been connected to the router.

7. The information processing device according to claim 6, further comprising:
a selecting unit configured to select a wired connection in which a connection is established to the device by the wired connection unit or a wireless connection in which a connection is established to the device by the wireless connection unit,
wherein in a case where the wireless connection is selected by the selecting unit, the wireless connection unit establishes a wireless connection to the device.

8. The information processing device according to claim 7, further comprising:
a confirmation unit configured to confirm whether a wireless connection performed by the wireless connection unit is available,
wherein in a case where the confirmation unit confirms that the wireless connection is unavailable, the control unit performs control such that the wireless connection is not selected by the selecting unit.

9. The information processing device according to claim 1, wherein
the device is operable as an access point, and
in a case where the wireless connection unit is connected to the device by the second connection method, the wireless connection unit accesses the device operating as an access point and establishes a connection to the device.

10. The information processing device according to claim 9, wherein the determination unit determines whether the information processing device has already been connected to the wireless router, by determining whether the access point to which a connection has already been established matches a certain device type corresponding to the device.

11. The information processing device according to claim 10, wherein in a case where it is determined that the access point to which the connection has already been established matches the certain device type, the determination unit determines that the information processing device has not yet been connected to the wireless router.

12. The information processing device according to claim 1, wherein the device is a printing device configured to print an image on a print medium.

13. A control method for an information processing device, the information processing device being wirelessly connectable to a device that is configured to perform a certain process, by a first connection method in which a connection is established to the device via a wireless router, which is an external wireless router and differs from the device, or by a second connection method in which a connection is established to the device not via the wireless router, the control method comprising:
determining whether the information processing device has already been wirelessly connected to the wireless router; and
performing control, in a case where it is determined in the determining step that the information processing device has already been wirelessly connected to the wireless router, such that the information processing device is not connected to the device by the second connection method.

14. The control method for the information processing device according to claim 13, wherein
the information processing device establishes a connection to the device by the first or second connection method selected through a screen for selecting the connection method to be used by the information processing device, and
in the case where it is determined in the determining step that the information processing device has already been wirelessly connected to the wireless router, in the performing step, display control is performed in which the screen is displayed such that the second connection method cannot be selected through the screen.

15. The control method for the information processing device according to claim 14, wherein in the performing step, display control is performed such that on the screen displayed, the second connection method is not able to be selected even when information indicating the second connection method is included in the screen and the information is specified.

16. The control method for the information processing device according to claim 14, wherein in the performing step, display control is performed such that on the screen displayed, the screen includes no information indicating the second connection method.

17. The control method for the information processing device according to claim 13, wherein in a case where it is determined in the determining step that the information processing device has not yet been wirelessly connected to the wireless router, the information processing device is connectable to the device by the second connection method.

18. The control method for the information processing device according to claim 13, wherein
the information processing device is connectable to a router in a wired manner, and
the information processing device is connectable to the device by the second connection method even in a case where the information processing device has already been connected to the router in the wired manner.

19. The control method for the information processing device according to claim 13, wherein the device is a printing device configured to print an image on a print medium.

20. A non-transitory storage medium storing a program for causing a computer to execute the control method according to claim 13.

* * * * *